US010021075B1

(12) United States Patent
Saad (10) Patent No.: US 10,021,075 B1
(45) Date of Patent: Jul. 10, 2018

(54) MULTIPLE DATA CENTER DATA SECURITY (71) Applicant: EMC IP Holding Company, LLC, Hopkinton, MA (US)

(72) Inventor: Yossef Saad, Gannei Tikva (IL)

(73) Assignee: EMC IP Holding Company LLC, Hopkinton, MA (US)

(*) Notice: Subject to any disclaimer, the term of this patent is extended or adjusted under 35 U.S.C. 154(b) by 151 days.

(21) Appl. No.: 15/191,361

(22) Filed: Jun. 23, 2016

(51) Int. Cl.
G06F 11/00 (2006.01)
H04L 29/06 (2006.01)
G06F 11/14 (2006.01)
H04L 9/30 (2006.01)

(52) U.S. Cl.
CPC ...... H04L 63/0428 (2013.01); G06F 11/1471 (2013.01); H04L 9/30 (2013.01); G06F 2201/805 (2013.01); G06F 2201/84 (2013.01); G06F 2201/85 (2013.01)

(58) Field of Classification Search
CPC ............... H04L 63/0042; H04L 63/045; H04L 63/0471; H04L 9/3255; H04L 9/3249; H04L 9/3355; G06F 12/1408; G06F 15/173; G06F 21/554; G06F 21/602
See application file for complete search history.

(56) References Cited

U.S. PATENT DOCUMENTS

| 7,958,372 | B1 * | 6/2011 | Natanzon | G06F 21/80 713/189 |
| 8,826,025 | B2 * | 9/2014 | Sakumoto | H04L 9/3093 380/30 |
| 8,832,399 | B1 * | 9/2014 | Natanzon | G06F 3/065 711/112 |
| 9,152,578 | B1 * | 10/2015 | Saad | G06F 12/1408 |
| 9,420,007 | B1 * | 8/2016 | Roth | H04L 63/205 |
| 9,608,813 | B1 * | 3/2017 | Roth | H04L 9/0894 |
| 9,705,850 | B2 * | 7/2017 | Huang | H04L 63/0428 |
| 9,722,788 | B1 * | 8/2017 | Natanzon | H04L 9/0891 |
| 9,749,300 | B1 * | 8/2017 | Cale | H04L 63/0428 |
| 2005/0228795 | A1 * | 10/2005 | Shuster | G06F 21/564 |
| 2012/0216052 | A1 * | 8/2012 | Dunn | G06F 21/78 713/193 |
| 2013/0097304 | A1 * | 4/2013 | Asthana | H04L 41/5025 709/224 |

(Continued)

Primary Examiner — Bryce P Bonzo
Assistant Examiner — Jeison C Arcos
(74) Attorney, Agent, or Firm — Staniford Tomita LLP (57) ABSTRACT Securely replicating backup data in a network having a production site and a plurality of remote sites by generating in the production site a data encryption key, and in each remote site a respective key encryption key that are sent to the production site; encrypting a plurality of encrypted keys using the plurality of key encryption keys with one encrypted key per remote site, and transmitting to each remote site the encrypted keys for the other remote sites and not a remote site's own encrypted key; encrypting the data to create encrypted data blocks using the data encryption key; designating a selected remote site to become the new production site if the production site fails; and receiving in the new production site from a remaining remote site a key encryption key generated by the remaining remote site to enable the new production site to decrypt the data encryption key and use the decrypted data encryption key to decrypt the encrypted data blocks.

18 Claims, 5 Drawing Sheets (56) References Cited

U.S. PATENT DOCUMENTS

2014/0380054 A1* 12/2014 Roth ................... H04L 9/0822
                                                        713/171
2017/0026355 A1*  1/2017 Mathaiyan ............ H04L 63/08
2017/0076105 A1*  3/2017 Paulovicks ......... G06F 21/6218

* cited by examiner

MULTIPLE DATA CENTER DATA SECURITY

TECHNICAL FIELD

Embodiments are generally directed to data center management, and more specifically to securely replicating data between data centers.

BACKGROUND

Data centers are facilities used to house computer systems and associated components, such as telecommunications and storage systems. The data is meant to be very securely stored, so they generally include redundant or backup power supplies, redundant communication connections, extensive environmental controls (e.g., air conditioning, fire suppression), and various security measures (e.g., vaults, alarms, guards, etc.). Large data centers are often industrial scale operations and are increasingly used by large corporations, enterprises, government organizations, and the like.

The need for redundancy of data in data protection and disaster recovery (DR) systems means that data must be copied (replicated) among different server computers and storage devices. In large-scale environments, different data centers (sites) are often used to store the backup data, and these data centers can be separated by significant distances to ensure that a problem that affects one data center, such as a natural disaster, does not affect the backup sites. When sensitive data is replicated to remote data centers for disaster recovery purposes, the reality is that those sites are not always as secure as the main (production) sites. For example, in federal IT environments, the production site is staffed and tightly controlled, while the remote DR site in many cases is normally unstaffed or understaffed unless a disaster occurs. A DR site may have guards or security apparatus on the perimeter of the site, but typically not inside the data center, and the overall security of the site is often very much less than that of the production site. Oftentimes, more than one remote location is available for recovery in case of a disaster in more than one site. In fact certain products such as the RecoverPoint platform from EMC Corp. of Hopkinton, Mass. can replicate the same data to up to four remote sites). Although this greatly helps in data availability for recovery purposes, it does add potential security weakness if the additional remote (DR) sites are not as well protected as the primary or production site. Thus, present disaster recovery networks that rely on widely distributed, large-scale data centers are vulnerable to data access attacks if the available DR sites are not as tightly protected and controlled as the main production site.

One simple and present approach to protect the remote site data is to split the data when it is replicated to the remote sites in such a way that if one site is compromised an attacker will not gain access to all of the data through this attack. The data is split at the source and different pieces of the data are sent to the remote sites. In case a failover to the remote site is required, the data is reconstructed by sending the pieces from the other remote sites to the selected site. This approach however has some flaws. First, the split of the data may not be sufficient to successfully prevent reconstruction of the full data from one part of it. Without clear knowledge of the content, and not just the bits, this method cannot be proven to be sufficient. Second, each data part should be sent to more than one site for redundancy in case the remote site also fails in the disaster situation, so it becomes more complex to manage. Third, in case of a disaster at the production site, the data would need to be transmitted to the chosen failover site from all the other sites, which results delayed recovery and increased RTO (Recovery Time Objective). Fourth, the split of data does not save storage space in the remote sites. Even if the data is split into four parts for transmission to four remote sites, every site must still have storage capacity for the full data in case it is required to serve as a failover site.

What is needed therefore, is a system that distributes data among remote sites in such a way that if one site is compromised an attacker will not gain access to all of the data through this one attack, but instead would need to gain control over at least two remote sites (or three sites in some extreme sensitive situations).

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and RecoverPoint are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated data backup/recovery and data migration techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks) and SANs (storage area networks). Thus, aspects of the one or more embodiments described herein may be implemented on one or more computers executing software instructions, and the computers may be networked in a client-server arrangement or similar distributed computer network.

Figure 1:
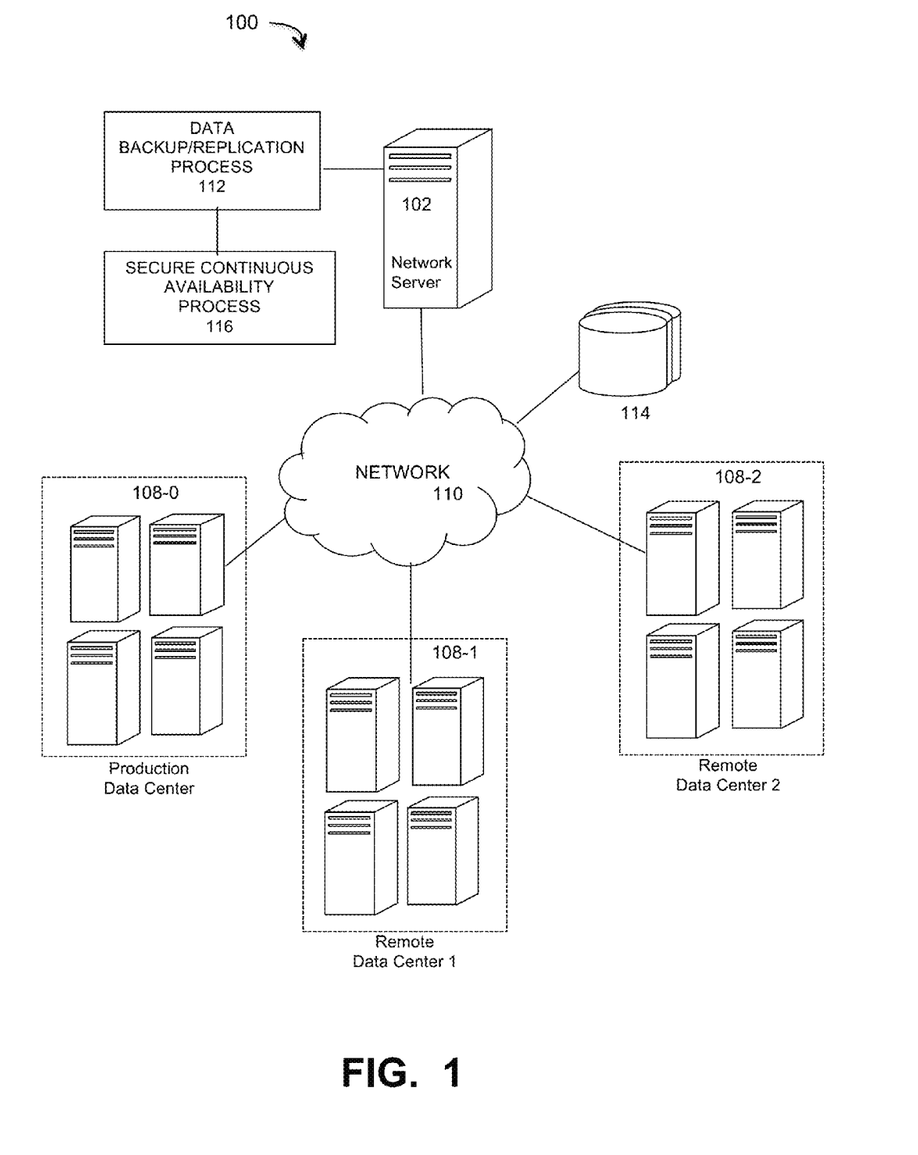
FIG. 1 is a diagram of a multiple data center network implementing an encryption based data security scheme under some embodiments.

FIG. 1 illustrates a computer network system 100 that implements one or more embodiments of multiple data center data security scheme. As shown in system 100, a number of data centers 108 are coupled to each other and each have an instance of a network server 102 (shown singularly for purposes of illustration) over network 110. The data centers may each represent large-scale data centers that are located in different geographic locations, such as different cities or regions of a country. One data center denoted as production site 108-0 represents a primary data center where data is primarily created, sourced, processed, and/or stored. It may represent the central data processing and storage facility of a company or governmental organization. To protect this data, a network server 102 executes a data backup/replication process 112 that periodically backs up the data in data center 108-1 it to other storage devices within the site or offsite data storage locations, e.g., network storage 114, which can be a RAID (redundant array of independent disks) storage location.

In an embodiment, remote data centers 108-1 and 108-2 may also represent disaster recovery and backup resources for the primary site 108-0. The remote data centers are typically used to stored exact and concurrent or near-concurrent copies of the production data center data so that in the event of any malicious attack or catastrophic failure, at least one of these remote data centers can take over immediately from the attacked or failed data center. In this case, data backup process 112 replicates data to the remote data centers on a continuous or near-continuous basis. Server 102 may also implement a continuous availability or failover process 116 that switches to the remote data center upon the failure or unavailability of the primary data center, such as in a continuous availability network system. It should be noted that access to the data is required not only when there is a failure in the production site, but it may also be needed for periodic DR tests, or for repurposing the data (e.g., using it for test and development at the remote site etc.), and other similar occurrences. Any such appropriate occurrence (which may or may not involve invoking DR routines) may be designated as a defined condition or event that triggers process 116.

The data centers may represent any type of computer network and associated data storage system, such as tape, magnetic disk, or solid-state disk storage devices arranged in any appropriate configuration, such as RAID arrays. The data centers may also represent virtual data centers 106 representing a physical or virtual network of many virtual machines (VMs), such as on the order of thousands of VMs each. The data sourced by the data source may be any appropriate data, such as database data that is part of a database management system. In this case, the data may reside on one or more hard drives and may be stored in the database in a variety of formats (e.g., XML or RDMS).

The network server computer 102 is coupled directly or indirectly to the target data centers 108, and to the data sources, network storage, and other resources over network 110, which may be a cloud network, LAN, WAN or other appropriate network. Network 110 provides connectivity to the various systems, components, and resources of system 100, and may be implemented using protocols such as Fibre Channel (FC), Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity drive (optical or magnetic) arrays. In an embodiment, the target storage devices, such as disk array 114 may represent any practical storage device or set of devices, such as fiber-channel (FC) storage area network devices, and OST (OpenStorage) devices.

As stated above, system 100 may represent a data migration system that copies or replicates real or virtual machine processes running in the data centers from one physical data center to another data center located in another, often distant, geographic location. The data replication process 112 is used in conjunction with a continuous availability process 116 and a data security mechanism that allows for data to be securely replicated in several remote location such that access to the data at the remote location cannot be achieved by accessing only one remote location, and access to at least two or three (or more) remote locations is required in order to access the data. FIG. 1 illustrates an example network in which one production data center and two remote data centers are shown, but embodiments are not so limited. It should be noted that any practical number of production and remote data centers may be present and utilize aspects of the secure continuous availability process 116.

Figure 2:
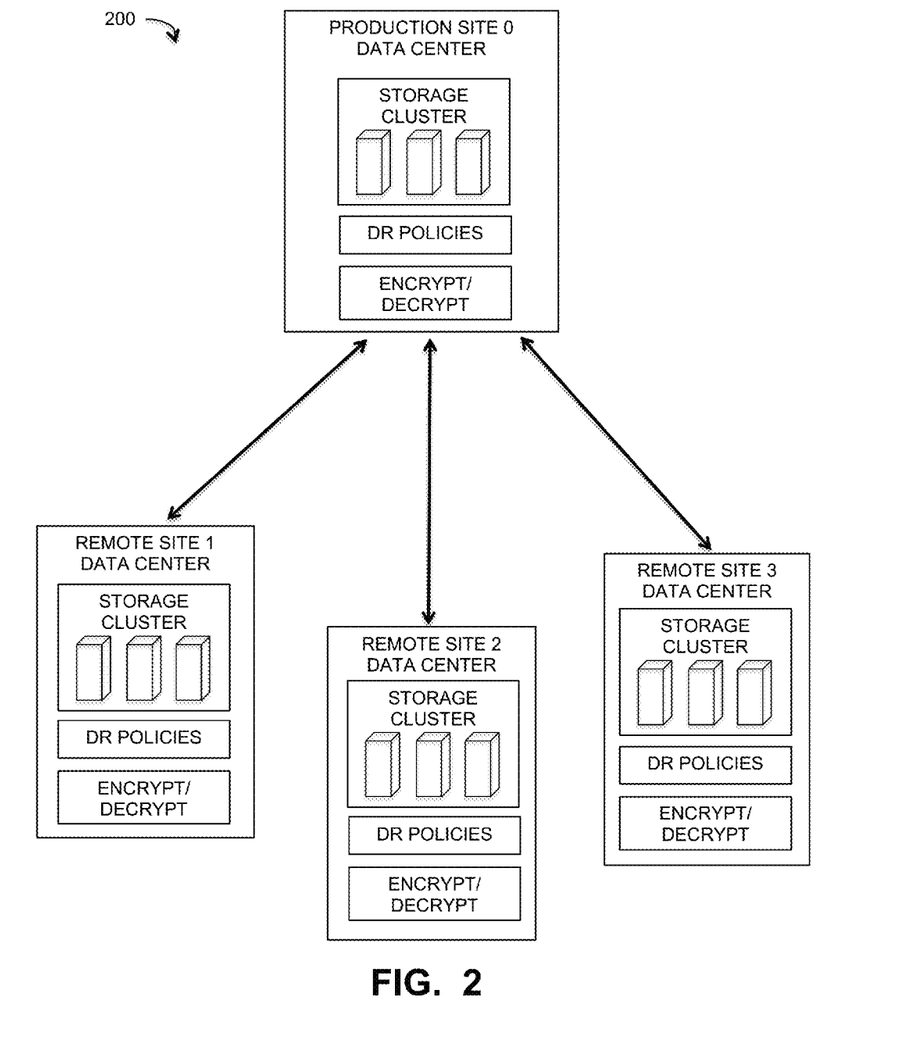
FIG. 2 illustrates an example network topography for a production site and remote sites under some embodiments.

FIG. 2 illustrates an example network topography for a production site and remote sites under some embodiments. Network 200 includes a production site (site 0) designated $S_0$, which is coupled over a network lines to a number of remote site data centers (site 1, site 2, site 3), designated $S_1$, $S_2$, $S_3$, and so on up to $S_n$ for N sites. Each data center includes computers or controllers and arrays or clusters of storage devices, such as RAID arrays. Each data center also includes functional components for implementing the disaster recovery policies, which define the procedures to enable the recovery or continuation of vital technology infrastructure and systems contained in the production site. These may include the backup/replication schedules, failover and failback rules, and so on. In an embodiment, each data center also includes certain encryption and decryption components or processes that perform the data encrypt/decrypt functions utilized by the secure continuous availability process 116.

In an embodiment, process 116 uses encryption functions to encode keys used by the production and remote sites to distribute the access requirements among the remote sites so that replicated data on a failed over site can only be accessed by decrypted keys from one or more other remote sites.

Figure 3:
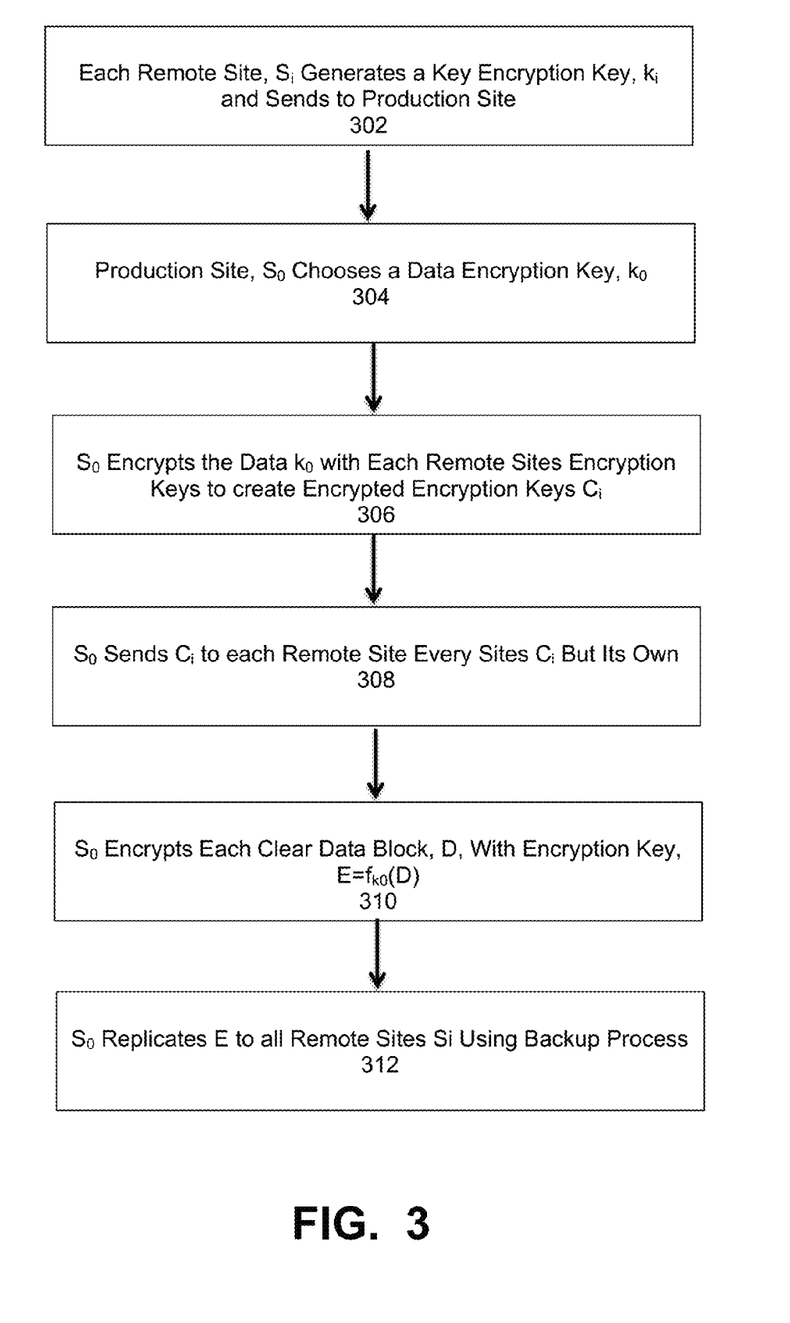
FIG. 3 is a flowchart that illustrates a method of securely replicating data in a multiple data center network environment under some embodiments.

FIG. 3 is a flowchart that illustrates a method of securely replicating data in a multiple data center network environment under some embodiments. In this process, the data block in the production is denoted as D, and as shown in FIG. 2 there is a production site ($S_0$) and N remote sites ($S_n$, n=1 . . . N), where N=3 for purposes of example illustration.

The data centers use an encryption function $f_k(X)$ that encrypts a data block X by using a key k. The encryption function may be any known and appropriate encryption function, such as RSA encryption algorithms, cryptographic hash functions, and the like. The data centers also use a public key system to transfer keys between sites. Any appropriate public key function or system can be used according to the level of security required. Using these functions, the security process of FIG. 3 implements a mechanism that requires access to two remote sites in order to access the data.

As shown in FIG. 3, Each remote site $S_i$ randomly generates a key encryption key, denotes as $k_i$ (i=1 . . . N), and securely sends it to the production site using a public key system, step 302. The production site $S_0$ randomly chooses a data encryption key $k_0$, step 304. The production site $S_0$ then encrypts $k_0$ using each of the remote sites' encryption keys, creating encrypted keys denoted as $C_i$: $C_i=f_{ki}(k_0)$, step 306. In a general case, k0 can be a set of keys, since the data can be encrypted in chunks, with every chunk having its own key; in this manner, all the keys can be encrypted together.

In step 308, the production site $S_0$ sends to all the remote sites all the encrypted keys $C_i$ except their own key, i.e., site $S_i$ will receive all $C_j$ where j≠i. Then for each clear data block D, $S_0$ encrypts it to create an encrypted data block E, where $E=f_{k0}(D)$, step 310. The production site then replicates E to all remote sites, step 312. In this manner, data is transmitted from the production site to all of the remote sites in the disaster recovery network.

Figure 4:
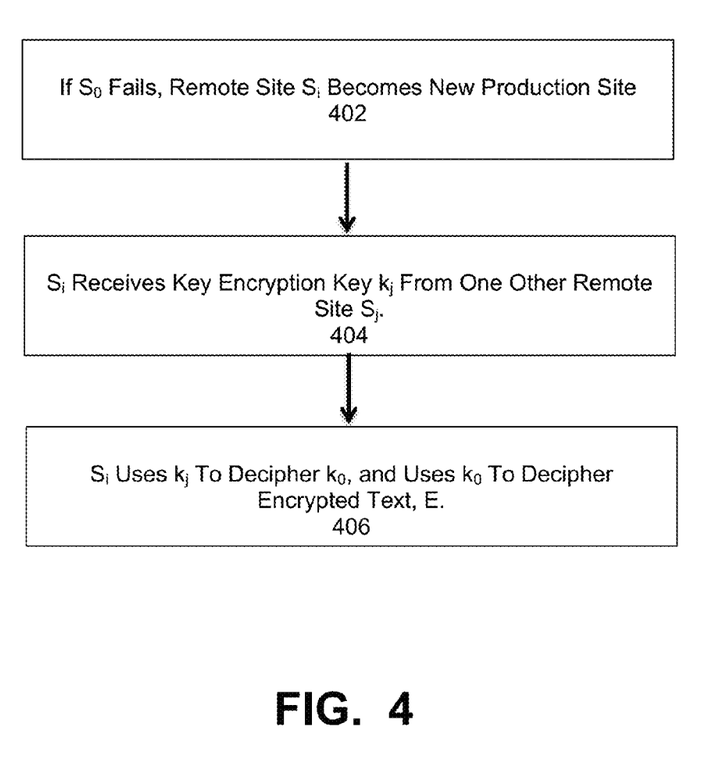
FIG. 4 illustrates a failover process using the encrypted keys and data of FIG. 3 under an embodiment.

FIG. 4 illustrates a failover process using the encrypted keys and data of FIG. 3 under an embodiment. As shown in FIG. 4, should a disaster occur and the production site $S_0$ is gone, any remote site ($S_i$) can become the new production site, step 402. In order to decrypt the data, the new production site $S_i$ will need to receive from one of the other remote sites ($S_j$) its key $k_j$, step 404. Once it receives this key, it uses it to decipher $k_0$ (by applying the inverse function of f(X) to Cj: $k0=f^{-1}_j(C_j)$) and then uses $k_0$ to decrypt the encrypted text E, step 406.

Figure 5:
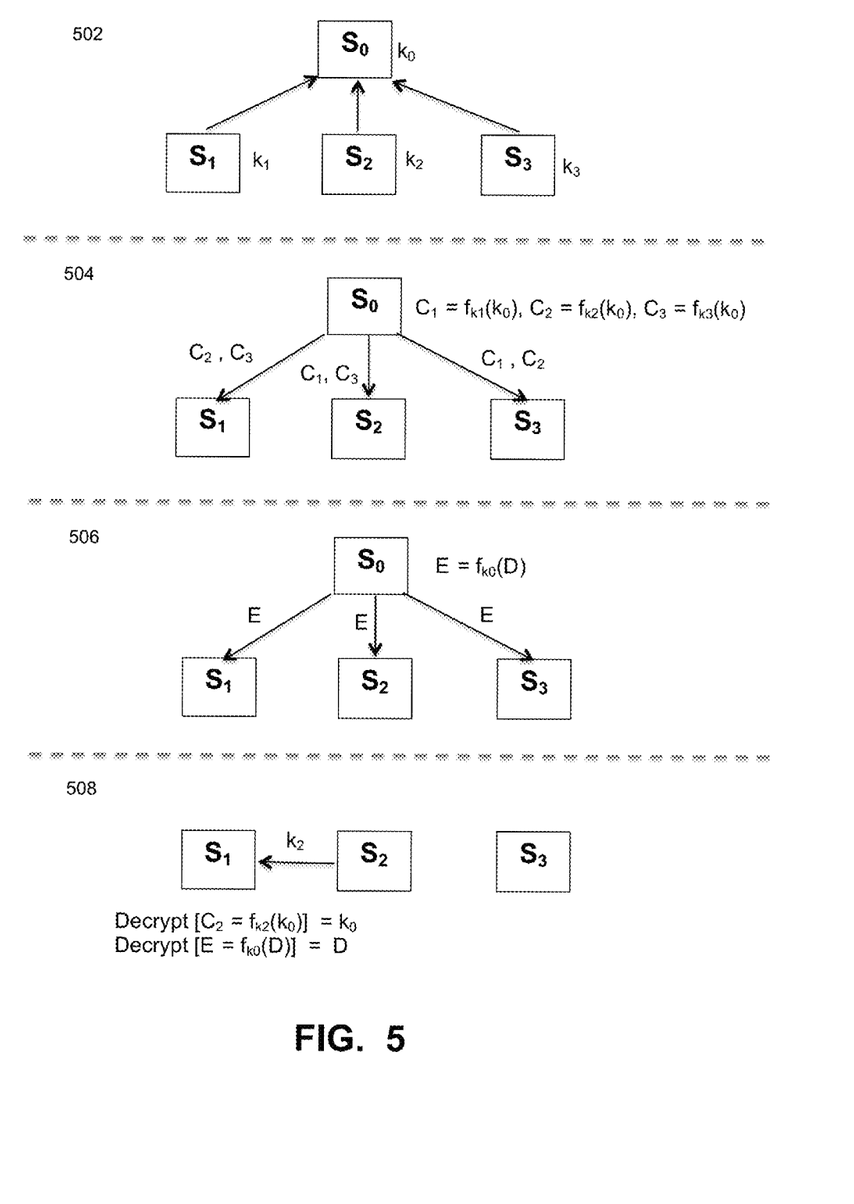
FIG. 5 is a state diagram that illustrates a configuration of production and remote sites for the processes of FIGS. 3 and 4 under an embodiment.

FIG. 5 is a state diagram that illustrates a configuration of production and remote sites for the processes of FIGS. 3 and 4 under an embodiment. As shown in panel 502, each site generates its own key and the remote sites send $S_0$ their key encryption keys $k_1$, $k_2$, and $k_3$. In panel 504, site $S_0$ creates encrypted keys $C_1=f_{ki}(k_0)$ or $C_1=f_{k1}(k_0)$, $C_2=f_{k2}(k_0)$, and $C_3=f_{k3}(k_0)$ for the example of FIG. 5. It then sends to site $S_1$ the encrypted keys $C_2$ and $C_3$, and to site $S_2$ the keys $C_1$ and $C_3$, and to site $S_3$ the keys $C_1$ and $C_2$. In panel 506 site $S_0$ encrypts the data using its data encryption key $k_0$ to generate $E=f_{k0}(D)$, and replicates the encrypted data to each of the remote sites. As shown in panel 508, if $S_0$ fails, one of the remote sites $S_1$ takes over to become the main site. One of the other remote sites sends its key to $S_1$, so either $S_2$ sends its key $k_2$ or $S_3$ sends its key $k_3$. The new main site $S_1$ then uses decryption functions to obtain the data key $k_0$ from the encrypted key string for the site that sent its key, $C_2$. Once it obtains the encryption key, it uses that to decrypt the encrypted data E to derive the actual data D. At this point, new production site $S_1$ has the data to be used by the data center processes.

The above-described mechanism requires access to at least two remote sites in order to recover the data. It can be enhanced to require access to at least three remote sites, and thereby providing higher level of security. This is done by the following new generalized process in which each remote site $S_i$ randomly generates a key encryption key, denotes as $k_n$ (n=1 . . . N), and securely sends it to the production site using public key system. The production site $S_0$ randomly chooses a data encryption key $k_0$ and encrypts $k_0$ using two encryption keys in multiple combinations. It then sends to each remote site $S_n$ (n=1 . . . N) only the following encrypted keys: $C_{ij}=f_{ki}(f_{kj}(k_0))$ i=1 . . . N−1, j=i+1 . . . N as long as i≠n and j≠n. For each clear data block D, $S_0$ encrypts it to create an encrypted data block E and replicates E to all remote sites, such that $E=f_{k0}(D)$. Should a disaster occur and the production site $S_0$ is gone, each remote site can become the new production site. In order to decrypt the data, it will need to receive from two of the other remote sites their keys $k_i$ and $k_j$, use them to decipher $k_0$, with which it will decipher the encrypted text E.

In this manner, a disaster recovery network can securely replicate data to several remote locations such that access to the data at the remote location cannot be achieved by accessing only one remote location. Depending on system configuration and network topography, access to at least two or three (or more) remote locations is required in order to access the data.

Although embodiments are described with respect to large-scale data centers in a DR environment, it should be understood that embodiments are not so limited. The encryption/decryption and transmission of production site and remote site keys may be implemented in smaller-scale networks where the nodes represent individual computers or data processing elements.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein.

Aspects of the methods, processes, and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Method and process steps may be executed by server or client side components that are processor-based components, programmed digital circuits, programmed arrays, and so on. Method steps may also be embodied as executable program code executed in a processor based system, such as a server computer or client computer coupled in a network. The terms, "component," "module," "procedure," "unit," and "engine" may all refer to a circuit that executes program code to perform a function implemented in software. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of securely replicating backup data in a network having a production site and a plurality of remote sites, comprising:
    generating in the production site a data encryption key, and in each remote site a respective key encryption key that are each sent to the production site;
    encrypting in the production site a plurality of encrypted keys using the plurality of key encryption keys, with one encrypted key per remote site;
    transmitting to each remote site the encrypted keys for the other remote sites and not a remote site's own encrypted key;
    encrypting, in the production site, the backup data to create a plurality of encrypted data blocks using the data encryption key;
    designating, in the event of a defined condition, a selected remote site to become the new production site; and
    receiving in the new production site from a remaining remote site a key encryption key generated by the remaining remote site to enable the new production site to decrypt the data encryption key and use the decrypted data encryption key to decrypt the encrypted data blocks.

2. The method of claim 1 wherein the production site and remote sites each comprise large-scale data centers, and wherein the defined condition comprises one of a failure of the production site, periodic disaster recovery testing, or repurposing the data.

3. The method of claim 2 wherein the data centers comprise large capacity storage arrays and components that implement disaster recovery rules to be used in event of the defined condition.

4. The method of claim 3 further comprising implementing the backup data replication as part of a disaster recovery process in a continuous availability network.

5. The method of claim 1 wherein the encrypting is performed using an RSA encryption algorithm.

6. The method of claim 1 wherein the transmitting is performed using a public key exchange process.

7. A computer-implemented method of requiring access to at least three remote sites to recover data in a network, comprising:
    generating at each remote site $S_i$, a respective key encryption key, $k_n$;
    transmitting each key encryption key to a production site using public key system, wherein the production site $S_0$ selects a data encryption key $k_0$;

encrypting $k_O$ using two encryption keys in multiple combinations to create encrypted keys $C_{ij}$;

transmitting to each remote site $S_O$ only encrypted keys: $C_{ij}=f_{ki}(f_{kj}(k_O))$ i=1 ... N−1, j=i+1 ... N as long as i≠n and j≠n;

encrypting each clear data block to create an encrypted data block E; and replicating E to all the remote sites, such that $E=f_{kO}(D)$ so that in the event of occurrence of a defined condition, any remote site can become a new production site.

8. The method of claim 7 wherein the defined condition comprises one of a failure of the production site, periodic disaster recovery testing, or repurposing the data, the method further comprising, in the event of the defined condition:

receiving at the new production site from two of the other remote sites their respective keys $k_i$ and $k_j$;

using $k_i$ and $k_j$ to decrypt $k_O$; and using $k_O$ to decipher the encrypted text E.

9. The method of claim 8 wherein n is any integer from 1 to a selected number N.

10. The method of claim 8 wherein the production site and remote sites each comprise large-scale data centers.

11. The method of claim 10 wherein the data centers comprise large capacity storage arrays and components that implement disaster recovery rules to be used in event of failure of the production site.

12. The method of claim 11 further comprising implementing the backup data replication as part of a disaster recovery process in a continuous availability network.

13. A system configured to securely replicate backup data in a network having a production site and a plurality of remote sites, comprising:

a remote site component generating in each remote site a respective key encryption key that are sent to the production site;

a production site component generating a data encryption key and encrypting a plurality of encrypted keys using the plurality of key encryption keys, with one encrypted key per remote site;

a transmission component transmitting to each remote site the encrypted keys for the other remote sites and not a remote site's own encrypted key;

a backup component encrypting the data to create a plurality of encrypted data blocks using the data encryption key;

a disaster recovery component designating, in the event of a defined condition, a selected remote site to become the new production site, and receiving in the new production site from a remaining remote site a key encryption key generated by the remaining remote site to enable the new production site to decrypt the data encryption key and use the decrypted data encryption key to decrypt the encrypted data blocks.

14. The system of claim 13 wherein the production site and remote sites each comprise large-scale data centers, and wherein the defined condition comprises one of a failure of the production site, periodic disaster recovery testing, or repurposing the data.

15. The system of claim 14 wherein the data centers comprise large capacity storage arrays and components that implement disaster recovery rules to be used in event of failure of the production site.

16. The system of claim 15 further comprising implementing the backup data replication as part of a disaster recovery process in a continuous availability network.

17. The system of claim 13 wherein the encryption component executes one or more RSA encryption algorithms.

18. The system of claim 13 wherein the transmission component comprises utilizes a public key exchange process.

* * * * *